(12) United States Patent
Kubota et al.

(10) Patent No.: US 9,905,853 B2
(45) Date of Patent: Feb. 27, 2018

(54) CONDUCTIVE CARBON, ELECTRODE MATERIAL INCLUDING SAID CARBON, ELECTRODE IN WHICH SAID ELECTRODE MATERIAL IS USED, AND ELECTRIC STORAGE DEVICE PROVIDED WITH SAID ELECTRODE

(71) Applicant: NIPPON CHEMI-CON CORPORATION, Tokyo (JP)

(72) Inventors: Satoshi Kubota, Tokyo (JP); Yoshihiro Minato, Tokyo (JP); Shuichi Ishimoto, Tokyo (JP); Kenji Tamamitsu, Tokyo (JP); Katsuhiko Naoi, Tokyo (JP); Wako Naoi, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 172 days.

(21) Appl. No.: 15/030,010

(22) PCT Filed: Oct. 16, 2014

(86) PCT No.: PCT/JP2014/077614
§ 371 (c)(1),
(2) Date: Jul. 13, 2016

(87) PCT Pub. No.: WO2015/056759
PCT Pub. Date: Apr. 23, 2015

(65) Prior Publication Data
US 2016/0322635 A1 Nov. 3, 2016

(30) Foreign Application Priority Data
Oct. 17, 2013 (JP) ................................. 2013-216581

(51) Int. Cl.
*H01M 4/587* (2010.01)
*H01M 4/525* (2010.01)
*H01M 4/485* (2010.01)
*H01M 4/505* (2010.01)
*H01M 4/36* (2006.01)
*H01M 10/0525* (2010.01)
*H01M 10/0568* (2010.01)
*H01M 10/0567* (2010.01)
*H01M 4/04* (2006.01)
*H01M 4/133* (2010.01)
*H01G 11/24* (2013.01)
*H01G 11/34* (2013.01)
*C01B 32/00* (2017.01)
*C01B 25/45* (2006.01)
*C01B 32/23* (2017.01)
*C01B 32/168* (2017.01)
(Continued)

(52) U.S. Cl.
CPC ............. *H01M 4/587* (2013.01); *C01B 25/45* (2013.01); *C01B 31/00* (2013.01); *C01B 32/15* (2017.08); *C01B 32/156* (2017.08); *C01B 32/168* (2017.08); *C01B 32/194* (2017.08); *C01B 32/198* (2017.08); *C01B 32/23* (2017.08); *H01G 11/24* (2013.01); *H01G 11/34* (2013.01); *H01M 4/0447* (2013.01); *H01M 4/133* (2013.01); *H01M 4/366* (2013.01); *H01M 4/485* (2013.01); *H01M 4/505* (2013.01); *H01M 4/525* (2013.01); *H01M 10/0525* (2013.01); *H01M 10/0567* (2013.01); *H01M 10/0568* (2013.01); *H01G 11/86* (2013.01); *H01M 4/622* (2013.01); *Y02E 60/13* (2013.01); *Y02T 10/7011* (2013.01); *Y02T 10/7022* (2013.01)

(58) Field of Classification Search
None
See application file for complete search history.

(56) References Cited

U.S. PATENT DOCUMENTS

2006/0239893 A1* 10/2006 Zhang .................... B01J 23/881
423/445 R
2012/0132861 A1 5/2012 Tamamitsu et al.
(Continued)

FOREIGN PATENT DOCUMENTS

JP 6-290780 A 10/1994
JP 2004-134304 A 4/2004
(Continued)

OTHER PUBLICATIONS

Larouche et al., "Classifying nanostructured carbons using graphitic indices derived from Raman spectra", Carbon, vol. 48, 2010, pp. 620-629.

*Primary Examiner* — Sin J Lee
(74) *Attorney, Agent, or Firm* — Birch, Stewart, Kolasch & Birch, LLP

(57) ABSTRACT

Provided is conductive carbon which gives an electric storage device having a high energy density. This conductive carbon is characterized in having a hydrophilic solid phase component, where a crystallite size La that does not include a twist in a graphene surface direction and a crystallite size Leq that includes a twist in a graphene surface direction, which are calculated from a Raman spectrum of the hydrophilic solid phase component, satisfy the following relationships: 1.3 nm≤La≤1.5 nm, and 1.5 nm≤Leq≤2.3 nm, and 1.0≤Leq/La≤1.55. When performing a rolling treatment on an active layer including an active particle and this conductive carbon formed on a current collector during manufacture of an electrode of an electric storage device, the pressure resulting from the rolling treatment causes this conductive carbon to spread in a paste-like form and increase in density while covering the surface of the active particles, the conductive carbon being pressed into gaps formed between adjacent active particles and filling the gaps. As a result, the amount of active material per unit volume in the electrode obtained after the rolling treatment increases, and the electrode density increases.

20 Claims, 4 Drawing Sheets

(51) Int. Cl.
*C01B 32/198* (2017.01)
*C01B 32/156* (2017.01)
*C01B 32/194* (2017.01)
*C01B 32/15* (2017.01)
*C01B 31/00* (2006.01)
*H01M 4/62* (2006.01)
*H01G 11/86* (2013.01)

(56) References Cited

U.S. PATENT DOCUMENTS

| | | |
|---|---|---|
| 2013/0095384 A1 | 4/2013 | Naoi et al. |
| 2016/0273100 A1* | 9/2016 | Shibuya ............... B08B 3/00 |
| 2016/0293959 A1* | 10/2016 | Blizanac ............... H01M 4/131 |
| 2016/0322634 A1* | 11/2016 | Korchev ............... H01M 4/583 |
| 2016/0329571 A1* | 11/2016 | Matsumoto ............. B01J 31/28 |
| 2016/0376153 A1* | 12/2016 | Meunier ............... C01B 31/043 |
| | | 516/32 |

FOREIGN PATENT DOCUMENTS

| | | |
|---|---|---|
| JP | 2009-35598 A | 2/2009 |
| JP | 2010-212309 A | 9/2010 |
| JP | 2012-36048 A | 2/2012 |
| JP | 2012-155916 A | 8/2012 |
| WO | WO 2011/122047 A1 | 10/2011 |

* cited by examiner

CONDUCTIVE CARBON, ELECTRODE MATERIAL INCLUDING SAID CARBON, ELECTRODE IN WHICH SAID ELECTRODE MATERIAL IS USED, AND ELECTRIC STORAGE DEVICE PROVIDED WITH SAID ELECTRODE

TECHNICAL FIELD

The present invention relates to conductive carbon that gives an electric storage device with a high energy density. The present invention also relates to an electrode material comprising the conductive carbon, an electrode using this electrode material, and an electric storage device equipped with this electrode.

THE RELATED ART

An electric storage device such as a secondary battery, an electric double layer capacitor, a redox capacitor and a hybrid capacitor is a device that is under consideration for wider application as a battery for an information device including a cellphone and a notebook-sized personal computer, for a motor drive power supply of a low-emission vehicle such as an electric vehicle and a hybrid vehicle, and for an energy recovery system, etc. In these devices, improvement in energy density is desired to meet the requirements of higher performance and downsizing.

In these electric storage devices, an electrode active material that realizes its capacity by a faradaic reaction involving the transfer of an electron with an ion in an electrolyte (including an electrolytic solution) or by a non-faradaic reaction not involving the transfer of an electron is used for energy storage. Further, this active material is generally used in the form of a composite material with an electroconductive agent. As the electroconductive agent, conductive carbon such as carbon black, natural graphite, artificial graphite, and carbon nanotube is generally used. This conductive carbon, used concurrently with a low-conductive active material, serves to add conductivity to a composite material, and furthermore, acts as a matrix to absorb the volume change in accordance with the reaction of the active material. Also, it serves to ensure an electron conducting path when the active material is mechanically damaged.

The composite material of the active material and the conductive carbon is generally manufactured by a method of mixing the particles of the active material and the conductive carbon. The conductive carbon does not make a significant contribution to the improvement of the energy density of an electric storage device, so the quantity of the conductive carbon per unit volume needs to be decreased and that of the active material needs to be increased to obtain an electric storage device with a high energy density. Therefore, consideration is given to a method to decrease the distance between the particles of the active material to increase the quantity of the active material per unit volume by improving the dispersibility of the conductive carbon or by reducing the structure of the conductive carbon. Also, consideration is given to a method to mix two or more different powder with different particle diameters as the particles of the active material.

For example, Patent Document 1 (JP 2004-134304 A) discloses a nonaqueous secondary battery that is equipped with a positive electrode that contains a small-sized carbon material having an average primary particle diameter of 10 to 100 nm (in its example, acetylene black) and that has a degree of blackness of 1.20 or more. A coating material used to form the positive electrode is obtained either by dispersing a mixture of an active material for a positive electrode, the abovementioned carbon material, a binder and a solvent by a high shear dispersing machine such as a high speed rotational homogenizer dispersing machine or a planetary mixer with three or more rotary axes, or by adding a dispersion body, in which a mixture of the abovementioned carbon material, a binder and a solvent are dispersed by a high shear dispersing machine, into a paste in which a mixture of the active material for a positive electrode, a binder and a solvent are dispersed, and further dispersing. By using the device that has a high shearing force, the carbon material, which is hard to disperse because of its small particle size, becomes evenly dispersed.

Also, Patent Document 2 (JP 2009-35598 A) discloses an electroconductive agent for an electrode for a nonaqueous secondary battery that consists of acetylene black whose BET-specific surface area is 30 to 90 $m^2/g$, dibutylphthalate (DBP) oil absorption quantity is 50 to 120 mL/100 g, and pH is 9 or more. The electrode for the secondary battery is formed by dispersing a mixture of this acetylene black and an active material in a fluid containing a binder to prepare slurry, and applying this slurry on a current collector and drying it. Since the acetylene black with the abovementioned characteristics has a smaller structure compared with Ketjen Black or other conventional acetylene blacks, the bulk density of a mixture of the acetylene black and the active material is improved and the battery capacity is improved.

Patent Document 3 (JP 6-290780 A) shows that if particles with a single average diameter are made spherical, their closest packed structure is either cubic close-packed or hexagonal close-packed and the packing rate is approximately 0.75, and the particles cannot be packed further and gaps are formed, and further shows that the packing rate can be increased by mixing particles that have so small a diameter that they can fill the gaps between the particles with a larger diameter. In its working example, an electrode material, which is prepared by mixing $LiCoO_2$ having an average diameter of 10 μm (a particle with a large diameter) with a particle having a small diameter with the particle diameter ratio of 0.05 at the mass ratio of 0.2 against the particle with a large diameter and by mixing the mixture with graphite powder as an electroconductive agent, is used.

PRIOR ARTS DOCUMENTS

Patent Documents

Patent Document 1: JP 2004-134304 A
Patent Document 2: JP 2009-35598 A
Patent Document 3: JP 6-290780 A

SUMMARY OF THE INVENTION

Problems to be Solved by the Invention

Further improvement of an electric storage device in terms of energy density is always desired. However, the inventors have examined the prior arts and found that even by the methods disclosed in Patent Documents 1 and 2, it is difficult to enable conductive carbon to infiltrate efficiently between the particles of an active material, and even by the method disclosed in Patent Document 3, it is difficult to enable a particle with a small diameter to infiltrate efficiently between larger particles, and therefore, it is difficult to shorten the distance between active material particles and increase the amount of the active material per unit volume.

Therefore, the inventors have found that there is a limitation to the improvement of the energy density with a positive electrode and/or a negative electrode using the composite material of particles of an active material and conductive carbon.

Therefore, the objective of the present invention is to provide conductive carbon that gives an electric storage device with a high energy density.

Means for Solving Problems

After a keen examination, the inventors have found that electrode density significantly increases by forming an electrode of an electric storage device by using a composite material of conductive carbon, which is obtained by giving a strong oxidizing treatment to a raw material of conductive carbon with an inner vacancy, and a particle of an active material. Moreover, extensive analysis of the conductive carbon used revealed that a hydrophilic solid phase component contained in the conductive carbon has a specific range of crystallite size and this component contributes to the improvement of the electrode density.

Therefore, the present invention, first of all, relates to conductive carbon for an electrode for an electric storage device, comprising a hydrophilic solid phase component, where a crystallite size La that does not include a twist in a graphene surface direction and a crystallite size Leq that includes a twist in a graphene surface direction, which are calculated from a Raman spectrum of the hydrophilic solid phase component, satisfy the following relationships:

$1.3 \text{ nm} \leq La \leq 1.5 \text{ nm}$, and $1.5 \text{ nm} \leq Leq \leq 2.3 \text{ nm}$, and $1.0 \leq Leq/La \leq 1.55$.

In the present invention, the "hydrophilic solid phase component" of the conductive carbon refers to the component collected by the following method: the conductive carbon with 1/1000 of the mass of pure water is added to 20 to 100 mL of pure water, the conductive carbon is sufficiently dispersed in the pure water by ultrasonic irradiation for 10 to 60 minutes, this dispersion is left for 10 to 60 minutes, and a supernatant liquid is collected. The component taken by the centrifugation as a solid object from the supernatant liquid is the "hydrophilic solid phase component." Also, La and Leq in the hydrophilic solid phase component refer to values calculated from a Raman spectrum by the following method: for a Raman spectrum obtained with a Laser Raman spectrophotometer (excitation light: argon ion laser, wavelength 514.5 nm), waveform separation is conducted by applying the least square method with regard to the following seven components:

Component a: peak in the vicinity of 1180 cm$^{-1}$
Component b: peak in the vicinity of 1350 cm$^{-1}$, D band
Component c: peak in the vicinity of 1510 cm$^{-1}$
Component d: peak in the vicinity of 1590 cm$^{-1}$, G band
Component e: peak in the vicinity of 1610 cm$^{-1}$
Component f: peak in the vicinity of 2700 cm$^{-1}$, 2D band
Component g: peak in the vicinity of 2900 cm$^{-1}$, D+G band with a fitting analysis program of analysis software (spectra manager), using the waveforms of mixed Gaussian/Lorentzian functions, and varying the wave number and half width of each component, so that they are within the range of the following:

Component a: wave number 1127-1208 cm$^{-1}$, half width 144-311 cm$^{-1}$
Component b: wave number 1343-1358 cm$^{-1}$, half width 101-227 cm$^{-1}$
Component c: wave number 1489-1545 cm$^{-1}$, half width 110-206 cm$^{-1}$
Component d: wave number 1571-1598 cm$^{-1}$, half width 46-101 cm$^{-1}$
Component e: wave number 1599-1624 cm$^{-1}$, half width 31-72 cm$^{-1}$
Component f: wave number 2680-2730 cm$^{-1}$, half width 100-280 cm$^{-1}$
Component g: wave number 2900-2945 cm$^{-1}$, half width 100-280 cm$^{-1}$.

Then, with the peak area of the component d or the G band, the peak area of the component b or the D band, and the peak area of the component f or the 2D band, which are obtained by the waveform separation, La and Leq are calculated by the following formulae. The calculation of La and Leq from a Raman spectrum with the following formulae is known (CARBON 48 (2010) 620-629):

$La = 4.4 \times$ (the peak area of $G$ band/the peak area of $D$ band) nm $Leq = 8.8 \times$ (the peak area of $2D$ band/the peak area of $D$ band) nm.

The relationship between La and Leq is shown conceptually in the following diagrams, where (A) shows a crystallite with a twist on the graphene surface and (B) shows a crystallite without a twist on the graphene surface. The more the value of Leq/La deviates from 1, the more crystallites with a twist on the graphene surface shown in (A) included. Also, it has been found that the value of Leq/La increases as the value of La increases.

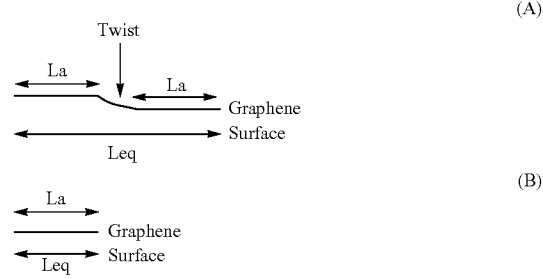

In the course of giving a strong oxidizing treatment to a carbon raw material, a crystallite in the direction of the graphene surface is severed, especially in a twisted area, and the conductive carbon of the present invention comprising a hydrophilic solid phase component whose La and Leq are within the abovementioned specific ranges is obtained. The conductive carbon of the present invention, compared with conductive carbon such as Ketjen Black and acetylene black that are conventionally used to form an electrode of an electric storage device, has smaller values of La and Leq and its hydrophilic solid phase component has fewer twists on the graphene surface, which is evaluated in reference to the value of Leq/La. If La and Leq of the hydrophilic solid phase component are within the abovementioned range, conductive carbon will have high flexibility, and if pressure is applied to the conductive carbon, the particles of the carbon will be transformed and spread in a paste-like manner. Therefore, if an electrode material is obtained by mixing particles of an active material for a positive electrode or an active material for a negative electrode and the conductive carbon of the present invention, the conductive carbon will cover the surface of the particles of the active material in the process of mixing and the dispersibility of the particles of the active material will be improved. Then, by adding the electrode material obtained to a solvent in which a binder is solved as needed, kneading the mixture sufficiently, and applying the kneaded material obtained onto a current collector to form a positive electrode or a negative electrode of the electric storage device, an active material layer is formed, and after this active material layer is dried as needed, a rolling treatment is given to this active material layer, and then the conductive carbon of the present invention spreads in a paste-like manner due to the applied pressure and becomes dense while covering the surface of the particle of the active material, the particles of the active material approach each other, and accordingly, the conductive carbon of the present invention is pushed into the gap formed between the adjacent particles of the active material and fills the gap densely while covering the surface of the particles of the active material. As a result, the quantity of an active material per unit volume of a positive electrode or a negative electrode that can be obtained after rolling is increased and therefore the electrode density increases. Also, by using the electrode with this high electrode density, the energy density of the electric storage device is increased. If La and Leq are larger than the abovementioned ranges and the value of Leq/La is larger than the abovementioned area, the flexibility of the conductive carbon decreases, and the electrode density of a positive electrode or a negative electrode that can be obtained after rolling decreases. Conductive carbon with a hydrophilic solid phase component in which La and Leq are smaller than the abovementioned ranges and the value of Leq/La is smaller than the abovementioned range is hard to manufacture, and the effect of improving the electrode density tends to be saturated.

Also, in the course of giving a strong oxidizing treatment to a carbon raw material, the structure of carbon is severed at the same time as the crystallite is severed in the graphene surface direction in a hydrophilic solid phase component. The height of the structure is exhibited by the quantity of DBP oil absorption, and in a preferable embodiment of the conductive carbon of the present invention, the quantity of DBP oil absorption per 100 g of the conductive carbon is within the range of 100 to 200 mL. In the present invention, the quantity of DBP oil absorption of this value is measured in accordance with JIS K 6217-4.

The conductive carbon of the present invention can be suitably manufactured by an oxidizing treatment of a carbon raw material with an inner vacancy. The inner vacancy includes a pore in porous carbon powder as well as a hollow of Ketjen Black, an internal or interstitial pore of a carbon nanofiber or a carbon nanotube. It is difficult to obtain conductive carbon having a hydrophilic solid phase component that has La and Leq within the abovementioned specific ranges by an oxidizing treatment using a solid carbon raw material. Also, it has been found that in the course of oxidizing treatment of the carbon raw material with an inner vacancy, a micropore within the initial particle of the carbon raw material collapses and disappears due to fracturing of carbon and a reaction of a surface functional group, etc. In a preferable embodiment of the conductive carbon of the present invention, the number of micropores with a radius of 1.2 nm is decreased to 0.4 to 0.6 times the number of micropores with a radius of 1.2 nm in the carbon raw material. In the present invention, the number of micropores with a radius of 1.2 nm can be obtained from the result of the measurement of a micropore distribution in accordance with JIS Z8831-2.

As mentioned above, when a composite material of the conductive carbon of the present invention and particles of an electrode active material is employed as an electrode material to form an electrode of an electric storage device, the energy density of the electric storage device is improved. Therefore, the present invention also relates to an electrode material for an electric storage device comprising the conductive carbon of this invention and particles of an electrode active material.

In the electrode material of the present invention, it is preferable that the average diameter of the particles of the electrode active material is within a range of 0.01 to 2 μm. A particle with such a small diameter is likely to aggregate and is hard to disperse. However, because the flexible conductive carbon of the present invention attaches to and covers the surface of the particles of the active material, aggregation of the particles of the active material can be inhibited even if the average diameter of the particles of the active material is small. Moreover, it is preferable that the particles of the electrode active material are composed of fine particles with an average diameter of 0.01 to 2 μm that are operable as an active material of a positive electrode or an active material of a negative electrode and gross particles with an average diameter of more than 2 μm and not more than 25 μm that are operable as an active material of the same electrode as the fine particles. The conductive carbon of the present invention, which has abundant flexibility, attaches to and covers the surface of the fine particles as well as the surface of the gross particles, and the aggregation of these particles can be inhibited and the mixture of the particles of the active material and the conductive carbon can be homogenized. Further, the gross particles increase the electrode density and improve the energy density of an electric storage device. Also, when pressure is applied to the active material layer that is formed on the current collector by a rolling treatment in manufacturing the electrode, the gross particles press the conductive carbon of the present invention and approach each other, so that the pastification and densification of the conductive carbon is accelerated. Further, in the course of the rolling treatment, with the approach of the gross particles, the fine particles press the conductive carbon of the present invention and are pushed out into the gaps formed between adjacent gross particles together with the paste-like conductive carbon, and fill the gaps densely, so that the electrode density further increases and the energy density of the electric storage device further improves. If the average diameter of the fine particles is 2 μm or less, the electrode density sharply increases, but if the average diameter of the fine particles is 0.01 μm or less, the effect of improving the electrode density tends to be saturated. The average diameter of the active material particles is the 50% diameter (median diameter) as in the measurement of particle size distribution obtained by using a light scattering particle size meter.

In the electrode material of the present invention, it is preferable that another kind of conductive carbon, especially conductive carbon that has a higher electroconductivity than the conductive carbon of the present invention, is further comprised. When pressure is applied to the electrode material when the electrode is manufactured, this carbon also densely fills the gaps formed by the adjacent particles of an active material together with the conductive carbon of the present invention and the conductivity of the whole electrode is improved, so that the energy density of an electric storage device further improves.

As mentioned above, if an electrode of an electric storage device is formed with the electrode material comprising the conductive carbon of the present invention and particles of an active material, the energy density of the electric storage device is improved. Therefore, the present invention also relates to an electrode of an electric storage device that has an active material layer formed by adding pressure to the electrode material of the present invention, and an electric storage device that is equipped with this electrode.

Advantageous Effects of the Invention

The conductive carbon of the present invention comprising a hydrophilic solid phase component, which has La and Leq within the specific ranges, has high flexibility, and when pressure is applied to the conductive carbon, the carbon particle is transformed and spread in a paste-like manner. In manufacturing the electrode of an electric storage device, when pressure is applied to the electrode material in which the particles of an electrode active material and the conductive carbon of the present invention are mixed, by the pressure, the conductive carbon of the present invention becomes spread in a paste-like manner and becomes dense while covering the surface of the particles of the active material, the particles of the active material approach each other, and accordingly, the conductive carbon of the present invention is pushed into the gap formed between the adjacent particles of the active material and fills the gap densely. As a result, the quantity of the active material per unit volume in the electrode is increased and the electrode density is increased. Moreover, by using this electrode with a high electrode density, the energy density of the electric storage device is improved.

DETAILED DESCRIPTION OF THE INVENTION

Figure 1:
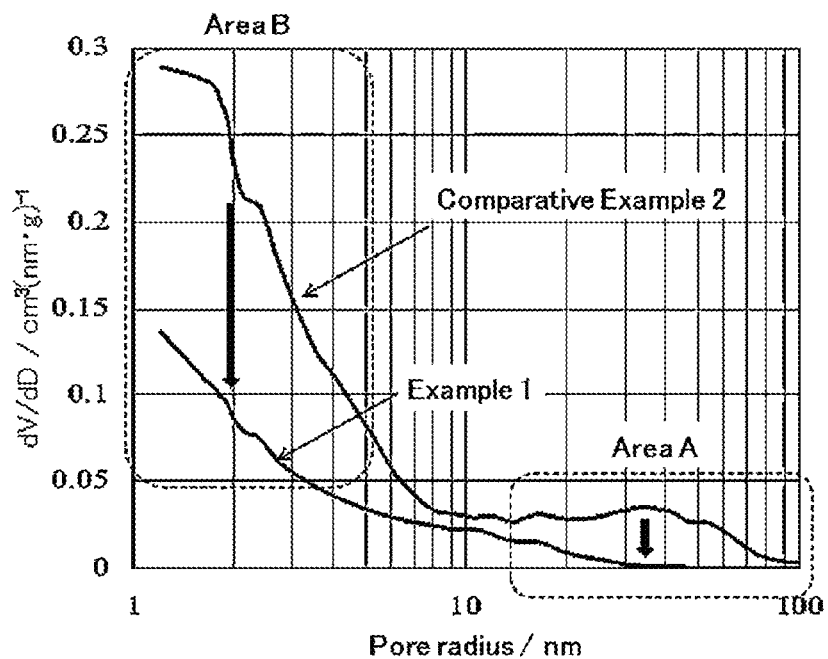
FIG. 1 shows a graph in which micropore distributions of conductive carbon in a working example and a comparative example are compared.

Conductive carbon of the present invention has high flexibility, and if pressure is applied to the conductive carbon, a carbon particle is transformed and spread in a paste-like manner. This characteristic mainly derives from a hydrophilic solid phase component comprised in the conductive carbon. The crystallite size La that does not include a twist in the graphene surface direction and the crystallite size Leq that includes a twist in the graphene surface direction, which are calculated from a Raman spectrum of this hydrophilic solid phase component, satisfy the following relationships:

$$1.3 \text{ nm} \leq La \leq 1.5 \text{ nm, and}$$

$$1.5 \text{ nm} \leq Leq \leq 2.3 \text{ nm, and}$$

$$1.0 \leq Leq/La \leq 1.55.$$

If La and Leq are larger than the abovementioned ranges and the value of Leq/La is larger than the abovementioned area, the flexibility of the conductive carbon decreases, and the electrode density of a positive electrode or a negative electrode that is obtained after rolling decreases. Conductive carbon with a hydrophilic solid phase component in which La and Leq are smaller than the abovementioned ranges and the value of Leq/La is smaller than the abovementioned range is hard to manufacture, and the effect of improving the electrode density tends to be saturated.

The conductive carbon of the present invention is obtained by giving a strong oxidizing treatment to a carbon raw material, especially a carbon raw material with an inner vacancy such as porous carbon powder, Ketjen Black, carbon nanofiber and carbon nanotube. In the course of a strong oxidizing treatment, a crystallite is fractured and especially, a crystallite in the graphene surface direction is severed in a twisted area, so that the conductive carbon comprising a hydrophilic solid phase component with La and Leq that satisfy the abovementioned specific relationships can be obtained.

Also, in the course of giving a strong oxidizing treatment to a carbon raw material, a part of conjugated double bonds of graphene in the carbon is oxidized and denatured. The denaturation of carbon can also be judged from a Raman spectrum from 980 to 1780 $cm^{-1}$ in the hydrophilic solid phase component. The following shows the components a to e included in the aforementioned Raman spectrum and their origin as well as their bonding states of carbon.

| Raman Band: Origin | Bonding State of Carbon |
|---|---|
| Component a: polyene (in the vicinity of 1180 $cm^{-1}$) | —C=C—C=C— |
| Component b: irregular graphite with oxidized edge (in the vicinity of 1350 $cm^{-1}$) | HO, O, HOOC, OH (polycyclic aromatic structure) |
| Component c: amorphous component (in the vicinity of 1510 $cm^{-1}$) | —C—C—C—C— |
| Component d: ideal graphite (in the vicinity of 1590 $cm^{-1}$) | (graphene hexagonal structure) |

| Raman Band: Origin | Bonding State of Carbon |
|---|---|
| Component e: irregular graphite with oxidized surface (in the vicinity of 1610 cm$^{-1}$) | 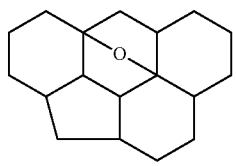 [SMILES: C1CC2CCC3CC4CCCC56CC(C1)C2(O5)C3C46] |

The component c derives from a carbon single bond (SP$^3$ hybridization) that is formed as a result of the strong oxidation of a conjugated double bond (SP$^2$ hybridization) in graphene, and is also referred to as an amorphous component band. When a Raman spectrum of the hydrophilic solid phase component in the conductive carbon of the present invention is measured in the range from 980 to 1780 cm$^{-1}$, it was found that the ratio of the amorphous component band is remarkably increased. This remarkable increase in the amorphous component is conceivably a cause for La and Leq with the abovementioned specific relationships. In a preferable embodiment of the conductive carbon of the present invention, the ratio of the peak area of the amorphous component band (component c) in the vicinity of 1510 cm$^{-1}$ against the peak area in the range from 980 to 1780 cm$^{-1}$ in a Raman spectrum of the hydrophilic solid phase component falls within the range of 13 to 19%, and more preferably within the range of 14 to 18%. The peak area of the range from 980 to 1780 cm$^{-1}$ corresponds to the total peak area of components a to e. The ratio of the peak area of the amorphous component band in the vicinity of 1510 cm$^{-1}$ against the peak area in the range from 980 to 1780 cm$^{-1}$ in a Raman spectrum of the hydrophilic solid phase component is hereinafter referred to as the "amorphous component ratio." If the amorphous component ratio is within the abovementioned range, an electrode with a high electrode density can be stably obtained.

Also, in the course of giving a strong oxidizing treatment to a carbon raw material, the structure of carbon is severed at the same time as the crystallite is severed in the graphene surface direction in the hydrophilic solid phase component. In a preferable embodiment of the conductive carbon of the present invention, the quantity of DBP oil absorption is within the range of 100 to 200 mL/100 g.

Also, it has been found that, in the course of oxidizing treatment of the carbon raw material with an inner vacancy, a micropore within the initial particle of the carbon raw material collapses and disappears, and the specific surface area decreases due to fracturing of carbon and a reaction of a surface functional group, etc. In a preferable embodiment of the conductive carbon of the present invention, the number of micropores with a radius of 1.2 nm is decreased to 0.4 to 0.6 times the number of micropores with a radius of 1.2 nm in the carbon raw material. Also, in a preferable embodiment of the conductive carbon of the present invention, the specific surface area is within the range of 650 to 800 cm$^2$/g. The specific surface area means a value measured in accordance with JIS Z8830.

The conductive carbon of the present invention can be suitably obtained by the first manufacturing method comprising:

(a1) a process in which oxidizing treatment is given to a carbon raw material with an inner vacancy;
(b1) a process in which the product after oxidizing treatment and a transition metal compound are mixed;
(c1) a process in which the mixture obtained is pulverized to produce a mechanochemical reaction;
(d1) a process in which the product after the mechanochemical reaction is heated in a nonoxidizing atmosphere; and
(e1) a process in which the aforementioned transition metal compound and/or its reaction product is removed from the product after heating.

In the first manufacturing method, carbon with an inner vacancy such as porous carbon powder, Ketjen Black, carbon nanofiber and carbon nanotube is used as the carbon raw material. As such a carbon raw material, Ketjen Black is preferable. If solid carbon is used as a raw material and the same treatment as the first manufacturing method is used, the conductive carbon of the present invention is difficult to obtain.

In the (a1) process, the carbon raw material is left immersed in acid. As acid, an acid usually used for an oxidizing treatment of carbon such as nitric acid, a mixture of nitric acid and sulfuric acid, and an aqueous solution of hypochlorous acid can be used. The immersion time depends on the concentration of acid or the quantity of the carbon raw material to be treated, and is usually within the range of 5 minutes to 1 hour. The carbon after oxidizing treatment is sufficiently washed by water and dried, and then mixed with a transition metal compound in the (b1) process.

For the chemical compound of transition metal to be added to the carbon raw material in the (b1) process, an inorganic metallic salt of transition metal such as a halide, nitrate, sulfate and carbonate; an organic metallic salt of transition metal such as formate, acetate, oxalate, methoxide, ethoxide and isopropoxide; or a mixture thereof can be used. These chemical compounds can be used alone, or two or more kinds can be used as a mixture. Chemical compounds that contain different transition metals can be mixed in a prescribed amount and used. Also, a chemical compound other than the chemical compound of transition metal, such as an alkali metal compound, can be added concurrently unless it has an adverse effect on the reaction. Since the conductive carbon of the present invention is mixed with particles of an electrode active material and used in manufacturing an electrode of an electric storage device, it is preferable that a chemical compound of an element constituting the active material is added to the carbon raw material so that adulteration of an element that can serve as impurities against the active material can be prevented.

In the (c1) process, the mixture obtained in the (b1) process is pulverized and a mechanochemical reaction is produced. Examples of a powdering machine for this reaction are a mashing machine, millstone grinder, ball mill, bead mill, rod mill, roller mill, agitation mill, planetary mill, vibrating mill, hybridizer, mechanochemical composite device and jet mill. Milling time depends on the powdering machine used or the quantity of the carbon to be treated and has no strict restrictions, but is generally within the range of 5 minutes to 3 hours. The (d1) process is conducted in a nonoxidizing atmosphere such as a nitrogen atmosphere and an argon atmosphere. The temperature and time of heating is chosen in accordance with the chemical compound of transition metal used. In the subsequent (e1) process, the conductive carbon of the present invention can be obtained by removing the chemical compound of transition metal and/or its reaction product from the product that has been heated by means of acid dissolution etc., then sufficiently washing and drying them.

In the first manufacturing method, the chemical compound of transition metal promotes the oxidation of the carbon raw material by mechanochemical reaction in the (c1) process, and the oxidation of the carbon raw material rapidly proceeds. By this oxidation, the structure is severed and simultaneously a crystalline in the graphene surface direction is severed, especially in the twist area, and the flexible conductive carbon with a hydrophilic solid phase component that satisfies the abovementioned relationship of La and Leq can be obtained.

The conductive carbon of the present invention can also be suitably obtained by the second manufacturing method that comprises:
(a2) a process in which a carbon raw material with an inner vacancy and a chemical compound of transition metal are mixed;
(b2) a process in which the mixture obtained is heated in an oxidizing atmosphere; and
(c2) a process in which the abovementioned chemical compound of transition metal and/or its reaction product is removed from the product after heat treatment.

In the second manufacturing method, as the carbon raw material, carbon with an inner vacancy such as porous carbon powder, Ketjen Black, carbon nanofiber and carbon nanotube is used. As such a carbon raw material, Ketjen Black is preferable. If solid carbon is used as a raw material and the same treatment as the second manufacturing method is used, it is difficult to obtain the conductive carbon of the present invention.

As the chemical compound of transition metal to be added to the carbon raw material in the (a2) process, an inorganic metallic salt of transition metal such as a halide, nitrate, sulfate and carbonate; an organic metallic salt of transition metal such as formate, acetate, oxalate, methoxide, ethoxide and isopropoxide; or a mixture thereof can be used. These chemical compounds can be used alone, or two or more kinds can be mixed and used. Chemical compounds that contain different transition metals can be mixed in a prescribed amount and used. Moreover, a chemical compound other than a chemical compound of transition metal such as a chemical compound of alkali metal can be added concurrently unless it has an adverse effect on the reaction. This conductive carbon is mixed with the particle of an electrode active material particle and used in manufacturing an electrode of an electric storage device, so it is preferable to add a chemical compound of an element that constitutes the active material to the carbon raw material because this will prevent the mixing of an element that can be impurities against the active material.

The (b2) process is conducted in an oxidizing atmosphere, for example in air, and at a temperature at which carbon does not disappear, preferably at a temperature of 200 to 350° C.

In the subsequent (c2) process, the conductive carbon of the present invention can be obtained by removing the chemical compound of transition metal and/or its reaction product from the product that has been heated by means of acid dissolution etc., then sufficiently washing and drying them.

In the second manufacturing method, the chemical compound of transition metal acts as a catalyst to oxidize the carbon raw material in the heating process in an oxidizing atmosphere and the oxidation of the carbon raw material rapidly proceeds. By this oxidation, the structure is severed and simultaneously a crystallite in the graphene surface direction is severed, especially in the twist area, and the flexible conductive carbon with a hydrophilic solid phase component that satisfies the abovementioned relationship of La and Leq is obtained.

The conductive carbon of the present invention can be obtained by giving a strong oxidizing treatment to a carbon raw material with an inner vacancy, but it is also possible to promote the oxidation of the carbon raw material by a method other than the first manufacturing method or the second manufacturing method.

The conductive carbon of the present invention is used for an electrode of an electric storage device such as a secondary battery, an electric double layer capacitor, a redox capacitor and a hybrid capacitor in an embodiment in which the conductive carbon of the present invention is mixed with a particle of an electrode active material that realizes its capacity by a faradaic reaction that involves the transfer of an electron between an ion in the electrolyte of the electric storage device or a nonfaradaic reaction that does not involve the transfer of an electron. The electric storage device comprises a pair of electrodes (a positive electrode and a negative electrode) and an electrolyte that is placed between the electrodes as essential elements, and at least one of the positive electrode and the negative electrode is manufactured with an electrode material comprising the conductive carbon of the present invention and the particle of an electrode active material.

The electrolyte that is placed between a positive electrode and a negative electrode in an electric storage device can be an electrolytic solution that is held by a separator, a solid electrolyte, or a gel electrolyte, that is, an electrolyte that is used in a conventional electric storage device can be used without any restrictions. Representative electrolytes are as follows.

For a lithium ion secondary battery, an electrolytic solution in which a lithium salt such as $LiPF_6$, $LiBF_4$, $LiCF_3SO_3$ and $LiN(CF_3SO_2)_2$ is dissolved in a solvent such as ethylene carbonate, propylene carbonate, butylene carbonate and dimethylcarbonate can be used and held by a separator such as polyolefin fiber nonwoven fabric and glass fiber nonwoven fabric. Further, an inorganic solid electrolyte such as $Li_5La_3Nb_2O_{12}$, $Li_7La_3Zr_2O_{12}$ and $Li_7P_3S_{11}$, an organic solid electrolyte that is composed of a complex of a lithium salt and a macromolecule compound such as polyethylene oxide, polymethacrylate and polyacrylate, and a gel electrolyte in which an electrolytic solution is absorbed into polyvinylidene fluoride and polyacrylonitrile etc. are also used. For an electric double layer capacitor and a redox capacitor, an electrolytic solution in which a quaternary ammonium salt such as $(C_2H_5)_4NBF_4$ is dissolved in a solvent such as acrylonitrile and propylene carbonate is used. For a hybrid capacitor, an electrolytic solution in which a lithium salt is dissolved in propylene carbonate etc. or an electrolytic solution in which a quaternary ammonium salt is dissolved into propylene carbonate etc. is used.

The positive electrode or negative electrode of an electric storage device is generally manufactured by sufficiently kneading an electrode material comprising the conductive carbon of the present invention and the particles of an electrode active material together with a solvent in which a binder is dissolved as needed, forming an active material layer by applying the kneaded material obtained onto a current collector to form the positive electrode or negative electrode of the electric storage device by the doctor blade method etc., drying this active material layer as needed, and then giving the active material layer a rolling treatment. It is also suitable to form the kneaded substance obtained into a prescribed shape, crimp this onto a current collector and then give a rolling treatment to this. In the case where a solid electrolyte or a gel electrolyte is used as an electrolyte between a positive electrode and a negative electrode, a solid electrolyte is added to an electrode material comprising the conductive carbon of the present invention and an electrode active material particle in order to ensure an ion conductive pass in the active material layer. The mixture obtained is sufficiently kneaded together with a solvent in which a binder is dissolved as needed, an active material layer is formed using the kneaded material obtained, and a rolling treatment is given to this.

In the process to manufacture the electrode material by mixing the conductive carbon of the present invention and the electrode active material particles, the conductive carbon is attached to the surface of the active material particles and covers the surface, so that the aggregation of the active material particles can be inhibited. Also, by applying pressure in the course of a rolling treatment of the active material layer, a large area or all of the conductive carbon of the present invention spreads in a paste-like manner and becomes dense while covering the surface of the active material particles, the active material particles approach each other, and as a result, the conductive carbon of the present invention is pushed into the gap formed between the adjacent particles of the active material and fills the gap densely while covering the surface of the particles of the active material. Therefore, the quantity of the active material per unit volume in the electrode is increased, and the electrode density is increased. Also, by using the electrode with an increased electrode density, the energy density of the electric storage device is improved. This reveals that the densely filled paste-like conductive carbon has enough conductivity to serve as an electroactive agent and does not inhibit the impregnation of the electrolytic solution in the electric storage device.

As the active material for a positive electrode and the active material for a negative electrode that are mixed with the conductive carbon of the present invention in the manufacture of the electrode material, an active material for an electrode that is used in a conventional electric storage device can be used without any specific restrictions. The active material can be a single chemical compound or a mixture of two or more kinds of chemical compound.

Examples of a positive electrode active material for a secondary battery are, among all, $LiMO_2$ having a laminar rock salt structure, laminar $Li_2MnO_3$—$LiMO_2$ solid solution, and spinel $LiM_2O_4$ (M in the formula signifies Mn, Fe, Co, Ni or a combination thereof). Specific examples of these are $LiCoO_2$, $LiNiO_2$, $LiNi_{4/5}Co_{1/5}O_2$, $LiNi_{1/3}Co_{1/3}Mn_{1/3}O_2$, $LiNi_{1/2}Mn_{1/2}O_2$, $LiFeO_2$, $LiMnO_2$, $Li_2MnO_3$—$LiCoO_2$, $Li_2MnO_3$—$LiNiO_2$, $Li_2MnO_3$—$LiNi_{1/3}Co_{1/3}Mn_{1/3}O_2$, $Li_2MnO_3$—$LiNi_{1/2}Mn_{1/2}O_2$, $Li_2MnO_3$—$LiNi_{1/2}Mn_{1/2}O_2$—$LiNi_{113}Co_{1/3}Mn_{1/3}O_2$, $LiMn_2O_4$ and $LiMn_{3/2}Ni_{1/2}O_4$. Other examples include sulfur and a sulfide such as $Li_2S$, $TiS_2$, $MoS_2$, $FeS_2$, $VS_2$ and $Cr_{1/2}V_{1/2}S_2$, a selenide such as $NbSe_3$, $VSe_2$ and $NbSe_3$, an oxide such as $Cr_2O_5$, $Cr_3O_8$, $VO_2$, $V_3O_8$, $V_2O_5$ and $V_6O_{13}$ as well as a complex oxide such as $LiNi_{0.8}Co_{0.15}Al_{0.05}O_2$, $LiVOPO_4$, $LiV_3O_5$, $LiV_3O_8$, $MoV_2O_8$, $Li_2FeSiO_4$, $Li_2MnSiO_4$, $LiFePO_4$, $LiFe_{1/2}Mn_{1/2}PO_4$, $LiMnPO_4$ and $Li_3V_2(PO_4)_3$.

Examples of a negative electrode active material for a secondary battery are an oxide such as $Fe_2O_3$, MnO, $MnO_2$, $Mn_2O_3$, $Mn_3O_4$, CoO, $Co_3O_4$, NiO, $Ni_2O_3$, TiO, $TiO_2$, SnO, $SnO_2$, $SiO_2$, $RuO_2$, WO, $WO_2$ and ZnO, metal such as Sn, Si, Al and Zn, a complex oxide such as $LiVO_2$, $Li_3VO_4$ and $Li_4Ti_5O_{12}$, and a nitride such as $Li_{2.6}Co_{0.4}N$, $Ge_3N_4$, $Zn_3N_2$ and $Cu_3N$.

As an active material in a polarizable electrode of an electric double layer capacitor, a carbon material with a large specific surface area such as activated carbon, carbon nanofiber, carbon nanotube, phenol resin carbide, polyvinylidene chloride carbide and microcrystal carbon is exemplified. In a hybrid capacitor, a positive electrode active material exemplified for a secondary battery can be used as a positive electrode. In this case, a negative electrode is composed of a polarizable electrode using activated carbon etc. Also, a negative electrode active material exemplified for a secondary battery can be used as a negative electrode. In this case, a positive electrode is composed of a polarizable electrode using activated carbon etc. As a positive electrode active material of a redox capacitor, a metal oxide such as $RuO_2$, $MnO_2$ and NiO is exemplified, and a negative electrode is composed of an active material such as $RuO_2$ and a polarizable material such as activated carbon.

The shape and particle diameter of active material particles have no restrictions. Even if active material particles with an average diameter of 0.01 to 2 μm, which are generally easy to aggregate and difficult to disperse, is used, the aggregation of the active material particles can be suitably inhibited because the conductive carbon of the present invention, which has high flexibility, is attached to the surface of the active material particles and covers their surface. Also, it is preferable that the active material particles are composed of gross particles with a particle diameter of 1 μm or more and preferably 5 μm or more, and fine particles with a particle diameter of such a size that enables the fine particles to go into a gap formed by adjacent gross particles, preferably a particle diameter of one fifth or less of the gross particle and especially preferably one tenth or less of the gross particle, and that are operable as an active material of the same electrode as the gross particles. Especially, it is preferable that the active material particles are composed of fine particles with an average diameter of 0.01 to 2 μm and gross particles that are operable as an active material of the same electrode as the fine particles and that has an average diameter of more than 2 μm and not more than 25 μm. Since the highly flexible conductive carbon of the present invention is attached to and covers not only the surface of the gross particles but the surface of the fine particles in the manufacturing process of the electrode material, the highly flexible conductive carbon of the present invention can effectively inhibit the aggregation of these particles and improve the dispersion of the active material particles. Moreover, the gross particles increase the electrode density and improve the energy density of an electric storage device. Further, by the pressure due to a rolling treatment in manufacturing an electrode that is added to an active material layer that is formed on a current collector, the gross particles approach each other while pressing the conductive carbon of the present invention, and thus the pastification and densification of the conductive carbon is promoted. Also, in the course of a rolling treatment, as the gross particles approach each other, the fine particles press the conductive carbon of the present invention, are pushed into the gap formed between the adjacent gross particles together with the conductive carbon that is spread in a paste-like manner, and fill the gap densely, and the electrode density further increases and the energy density of the electric storage device further improves. If the average diameter of the fine particles is 2 μm or less, the electrode density rapidly increases, and if the average diameter of the fine particles is 0.01 μm or less, the effect of improving the electrode density tends to be saturated.

Also, the conductive carbon of the present invention can be used concurrently with conductive carbon other than the conductive carbon of the present invention, including carbon black such as Ketjen Black, acetylene black and channel black, fullerene, carbon nanotube, carbon nanofiber, amorphous carbon, carbon fiber, natural graphite, artificial graphite, graphitization KetjenBlack, mesoporous carbon, and vapor grown carbon fiber etc., which is used for an electrode of a conventional electric storage device. Especially, it is preferable to use concurrently carbon that has a higher electroconductivity than the electroconductivity of the conductive carbon of the present invention. Since the conductive carbon of the present invention is attached to and covers not only the surface of the active material particles, but also the surface of the conductive carbon used concurrently, the aggregation of the conductive carbon used concurrently can be inhibited. Moreover, by the pressure added to the active material layer formed on the current collector by a rolling treatment in manufacturing the electrode, the conductive carbon used concurrently densely fills the gap formed between the adjacent particles together with the conductive carbon of the present invention that is spread in a paste-like manner, and the electroconductivity of the entire electrode improves, and thus the energy density of the electric storage device further improves.

The method to mix the active material particles, the conductive carbon of the present invention and the other conductive carbon used concurrently as needed in manufacturing an electrode material has no restrictions, and a heretofore known method of mixing can be used. However, it is preferable to mix by dry mixing, and for dry mixing a mashing machine, millstone grinder, ball mill, bead mill, rod mill, roller mill, agitation mill, planetary mill, vibration mill, hybridizer, mechanochemical composite device and jet mill can be used. Especially, it is preferable to give a mechanochemical treatment to the active material particles and the conductive carbon of the present invention because the coatability and the evenness of the covering of the active material particles by the conductive carbon of the present invention are improved. The ratio of the amount of the active material particles and that of the conductive carbon of the present invention or the total amount of the conductive carbon of the present invention and the other conductive carbon used concurrently as needed is preferably within the range of 90:10 to 99.5:0.5 mass ratio and more preferably within the range of 95:5 to 99:1 in order to obtain an electric storage device with a high energy density. If the ratio of the conductive carbon is lower than the abovementioned range, the conductivity of the active material layer tends to become insufficient, and the covering rate of the active material particles by the conductive carbon tends to decrease. Also, if the ratio of the conductive carbon is larger than the abovementioned range, the electrode density tends to decrease and the energy density of the electric storage device tends to decrease.

As the current collector for an electrode of an electric storage device, an electroconductive material such as platinum, gold, nickel, aluminum, titanium, steel and carbon can be used. For the form of the current collector, any form such as a film, foil, plate, net, expanded metal, or cylinder can be adopted.

As the binder to be mixed with the electrode material, a heretofore known binder such as polytetrafluoroethylene, polyvinylidene fluoride, tetrafluoroethylene-hexafluoropropylene copolymer, polyvinyl fluoride and carboxymethylcellulose can be used. It is preferable that the amount of binder used is 1 to 30% by mass of the total amount of the mixed material. If the amount of binder used is 1% by mass or less, the strength of the active layer is not sufficient, and if the amount of binder used is 30% by mass or more, drawbacks such as a decrease in the discharge capacity of an electrode or excessive internal resistance arise. As the solvent to be mixed with the electrode material, a solvent such as N-methyl pyrrolidone that does not adversely affect the electrode material can be used without any restriction.

EXAMPLES

The present invention is explained in the following examples, though the present invention is not limited to the following examples.

(1) Conductive Carbon Manufactured by the First Manufacturing Method and an Electrode Containing the Carbon Obtained

Example 1

Ketjen Black (trade name: ECP600JP, manufacturer: Ketjen Black International Co.) weighing 10 g was added to 300 mL of 60% nitric acid and then the fluid obtained was irradiated by an ultrasonic wave for 10 minutes, and then the fluid was filtered and the Ketjen Black was retrieved. The retrieved Ketjen Black was washed with water three times and then dried, so that oxidized Ketjen Black was obtained. Then, 0.5 g of the oxidized Ketjen Black obtained was mixed with 1.98 g $Fe(CH_3COO)_2$, 0.77 g $Li(CH_3COO)$, 1.10 g $C_6H_8O_7 \cdot H_2O$, 1.32 g $CH_3COOH$, 1.31 g $H_3PO_4$, and 120 mL distilled water, and the mixed fluid obtained was agitated by a stirrer for 1 hour, and then the mixed fluid was evaporated, dried and solidified at 100° C. in air and a mixture was collected. Then, the mixture obtained was introduced into a vibratory ball mill device and pulverization was conducted at 20 Hz for 10 minutes. The powder obtained by pulverization was heated at 700° C. for 3 minutes in nitrogen, and a complex in which $LiFePO_4$ was supported by Ketjen Black was obtained.

1 g of the complex obtained was added to 100 mL of 30% hydrochloric acid aqueous solution, then the $LiFePO_4$ in the complex was dissolved by irradiating the fluid obtained with an ultrasonic wave for 15 minutes, and the remaining solid matter was filtered, washed with water and dried. A part of the solid matter after drying was heated to 900° C. in air and its weight loss was measured by TG analysis. Until it was confirmed that the weight loss was 100%, that is, no $LiFePO_4$ remained, the abovementioned process of dissolving $LiFePO_4$ in the hydrochloric acid aqueous solution, filtering, washing with water and drying was repeated, so that conductive carbon that did not contain any $LiFePO_4$ was obtained.

Then, the DBP absorption quantity, specific surface area and micropore distribution of the conductive carbon obtained were measured. Further, 40 mg of the conductive carbon obtained was added to 40 mL of pure water, and then the carbon was dispersed in the pure water by applying ultrasonic irradiation for 30 minutes. The resultant supernatant solution was collected and centrifuged, a solid phase area was gathered and dried, and a hydrophilic solid phase component was obtained. For the hydrophilic solid phase component obtained, a Raman spectrum was measured with a microscopic Raman measurement device (excitation ray: argon ion laser; wavelength: 514.5 nm). From the Raman spectrum obtained, the crystalline size La, which does not include a twist in the graphene surface direction, crystalline size Leq, which includes a twist in the graphene surface direction, Leq/La, and amorphous component ratio were calculated.

$Fe(CH_3COO)_2$, $Li(CH_3COO)$, $C_6H_8O_7 \cdot H_2O$, $CH_3COOH$ and $H_3PO_4$ were introduced into distilled water, and the compound liquid obtained was agitated by a stirrer for 1 hour, and then the compound liquid was evaporated, dried and solidified at 100° C. in air and then heated at 700° C. for 3 minutes in nitrogen, and LiFePO$_4$ fine particles with an initial particle diameter of 100 nm were obtained. Then, commercially available LiFePO$_4$ gross particles (initial particle diameter: 0.5 to 1 μm, secondary particle diameter: 2 to 3 μm), the fine particles obtained and the abovementioned conductive carbon were mixed at the ratio of 90:9:1, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and then given a rolling treatment, and a positive electrode of a lithium ion secondary battery was obtained. The electrode density of the positive electrode was calculated from the measured values of the volume and weight of the active material layer on the aluminum foil in the positive electrode.

Example 2

The procedure of Example 1 was repeated except that the process in which 0.5 g oxidized Ketjen Black, 1.98 g Fe(CH$_3$COO)$_2$, 0.77 g Li(CH$_3$COO), 1.10 g C$_6$H$_8$O$_7$—H$_2$O, 1.32 g CH$_3$COOH, 1.31 g H$_3$PO$_4$ and 120 mL distilled water were mixed was changed into a process in which 1.8 g oxidized Ketjen Black, 1.98 g Fe(CH$_3$COO)$_2$, 0.77 g Li(CH$_3$COO), 1.10 g C$_6$H$_8$O$_7$. H$_2$O, 1.32 g CH$_3$COOH, 1.31 g H$_3$PO$_4$ and 250 mL distilled water were mixed.

Example 3

The procedure of Example 1 was repeated except that the process in which 0.5 g oxidized Ketjen Black, 1.98 g Fe(CH$_3$COO)$_2$, 0.77 g Li(CH$_3$COO), 1.10 g C$_6$H$_8$O$_7$.H$_2$O, 1.32 g CH$_3$COOH, 1.31 g H$_3$PO$_4$ and 120 mL distilled water were mixed was changed into a process in which 1.8 g oxidized Ketjen Black, 0.5 g Fe(CH$_3$COO)$_2$, 0.19 g Li(CH$_3$COO), 0.28 g C$_6$H$_8$O$_7$. H$_2$O, 0.33 g CH$_3$COOH, 0.33 g H$_3$PO$_4$ and 250 mL distilled water were mixed.

Comparative Example 1

The oxidized Ketjen Black obtained in Example 1 was introduced into a vibratory ball mill device and pulverization was conducted at 20 Hz for 10 minutes. The powder obtained by pulverization were heated at 700° C. for 3 minutes in nitrogen. Then, the DBP absorption quantity, specific surface area and micropore distribution of the conductive carbon obtained were measured. Further, 40 mg of the conductive carbon obtained was added to 40 mL of pure water, and La, Leq, Leq/La, and the amorphous component ratio of the hydrophilic solid phase component were calculated by the same method as the method in Example 1. Also, with the conductive carbon obtained, a positive electrode that contained LiFePO$_4$ was formed by the same method as the method in Example 1, and its electrode density was calculated.

Comparative Example 2

The DBP oil absorption quantity, specific surface area and micropore distribution of the Ketjen Black raw material used in Example 1 were measured. Also, 40 mg of the Ketjen Black raw material used in Example 1 was added to 40 mL pure water, and La, Leq, Leq/La, and the amorphous component ratio of the hydrophilic solid phase component were calculated by the same method as the method in Example 1. Moreover, by using the Ketjen Black raw material, a positive electrode that contained LiFePO$_4$ was formed by the same method as the method in Example 1, and its electrode density was calculated.

Table 1 shows La, Leq and Leq/La, amorphous component ratio, DBP oil absorption quantity, specific surface area, ratio of the number of pores with the radius of 1.2 nm in the conductive carbon manufactured from the carbon raw material against the number of pores with the radius of 1.2 nm in the carbon raw material, which was calculated from the result of the measurement of pore distribution, of the conductive carbon and the value of electrode density in Examples 1 to 3 and Comparative Examples 1 and 2. It shows that the electrode density is not increased, that is, the quantity of active material particles in an electrode material is not increased, even if the conductive carbon in Comparative Examples 1 and 2, in which La and Leq of the hydrophilic solid phase component do not meet the relationships of 1.3 nm≤La≤1.5 nm, 1.5 nm≤Leq≤2.3 nm and 1.0≤Leq/La≤1.55, is used.

TABLE 1

The characteristics of conductive carbon and electrode densities

| | Leq (nm) | La (nm) | Leq/La | Amorphous component ratio (%) | DBP oil absorption quantity (mL/100 g) | Ratio of the number of pores (radius 1.2 nm) | Specific surface area (cm$^2$/g) | Electrode density (g/cc) |
|---|---|---|---|---|---|---|---|---|
| Example 1 | 1.69 | 1.30 | 1.3 | 17.5 | 130 | 0.45 | 670 | 2.75 |
| Example 2 | 1.80 | 1.40 | 1.3 | 17.3 | 150 | 0.55 | 690 | 2.72 |
| Example 3 | 2.20 | 1.50 | 1.5 | 14.3 | 180 | 0.59 | 740 | 2.65 |
| Comparative Example 1 | 2.35 | 1.55 | 1.6 | 11.9 | 210 | 0.66 | 950 | 2.50 |
| Comparative Example 2 | 3.10 | 1.60 | 1.9 | 9.8 | 350 | 1.00 | 1170 | 2.30 |

By comparing the conductive carbon (Ketjen Black raw material) of Comparative Example 2 and the conductive carbon obtained in Example 1, the effect of the process of the acid treatment of a carbon raw material→mixing a metal chemical compound→pulverization→heating in nitrogen (hereinafter referred to as a "strong oxidizing process") in Example 1 can be observed.

FIG. 1 is a graph that shows the result of the measurement of micropore distribution concerning the conductive carbon in Comparative Example 2 and Example 1. As a result of the strong oxidizing process, pores with a radius of approximately 25 nm or more that are found in carbon with a developed structure and that appear in area A almost disappear, and the number of pores with a radius of approximately 5 nm or less that are found in an initial particle and that appear in area B is significantly decreased. Therefore, it was found that the structure was severed and the pore in the initial particle collapsed by the strong oxidizing process. Also, the severance of the structure was confirmed by the abovementioned DBP oil absorption quantity.

Figure 2:
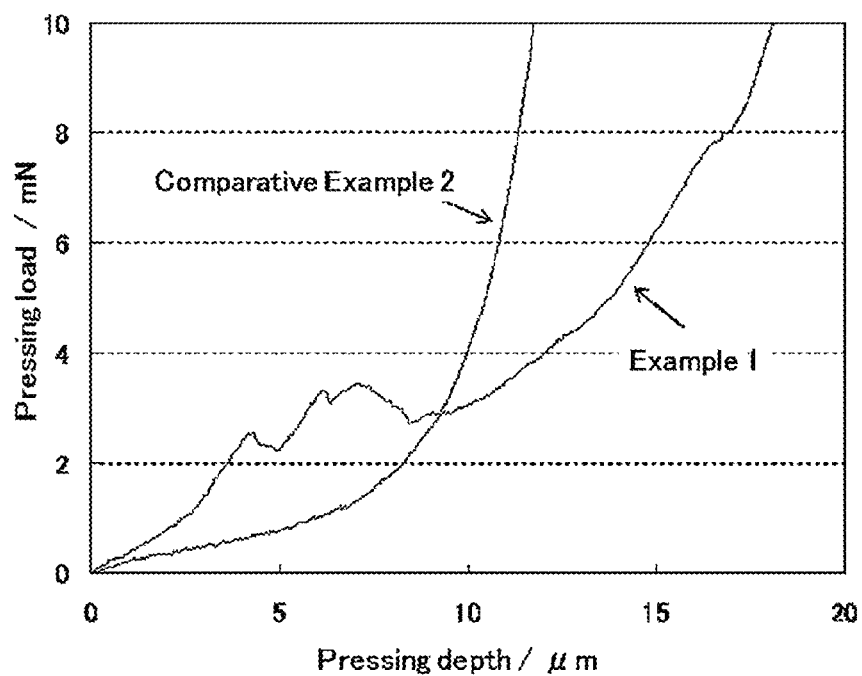
FIG. 2 shows a graph in which results of ultrafine hardness test on conductive carbon in a working example and a comparative example are compared.

FIG. 2 is a graph concerning the conductive carbon in Comparative Example 2 and Example 1 that shows the result of an ultramicro hardness test in which a pressing depth was increased to the order of nm and a corresponding pressing load was measured. The ultramicro hardness test was conducted by using the following method. 10 mg of the conductive carbon in Comparative Example 2 or Example 1 was dispersed in 50 mg ethanol, and the dispersoid obtained was coated on a glass plate and dried. By observing the surface of the glass plate through a microscope, a substantially spherical aggregate with a diameter of approximately 50 µm was selected, and the ultramicro hardness test was conducted on the selected aggregate. In the test, a hardness testing device with a spherical indenter with a radius of 100 µm (TI 950 TriboIndenter, manufacturer: Hysitron, Inc.) was employed and the change in the corresponding pressing load was measured while the pressing depth was increased in increments of 0.07 µm. As can be seen in FIG. 2, it was found that in the case of the conductive carbon in Comparative Example 2, the pressing load drastically increased in the vicinity of the pressing depth of approximately 10 µm, and the aggregated carbon particles were hard to transform. On the other hand, in the case of the conductive carbon in Example 1, the pressing load gradually increased and several fluctuations in loading occurred within the range of 0 to 20 µm of pressing depth. It is conceivable that the fluctuation in loading that can be seen at approximately 4 to 9 µm of pressing depth corresponds to the change in loading because a vulnerable area of the aggregate was severed, and a gradual increase in loading in the range of approximately 9 µm or more of pressing depth corresponds to the flexible transformation of the entire aggregate. This flexible transformation is a significant characteristic of the conductive carbon of the present invention. That is, in the slurry containing the gross particles of $LiFePO_4$, the fine particles of $LiFePO_4$ and the conductive carbon of the present invention, this conductive carbon covers the surface of the gross particles and the fine particles. After this slurry is applied to the aluminum foil and dried, the rolling treatment is given to the slurry, so that the conductive carbon, while being transformed in accordance with the added pressure, is pushed out between the adjacent gross particles together with the fine particles. It is considered that the electrode density is significantly increased accordingly.

Figure 3:
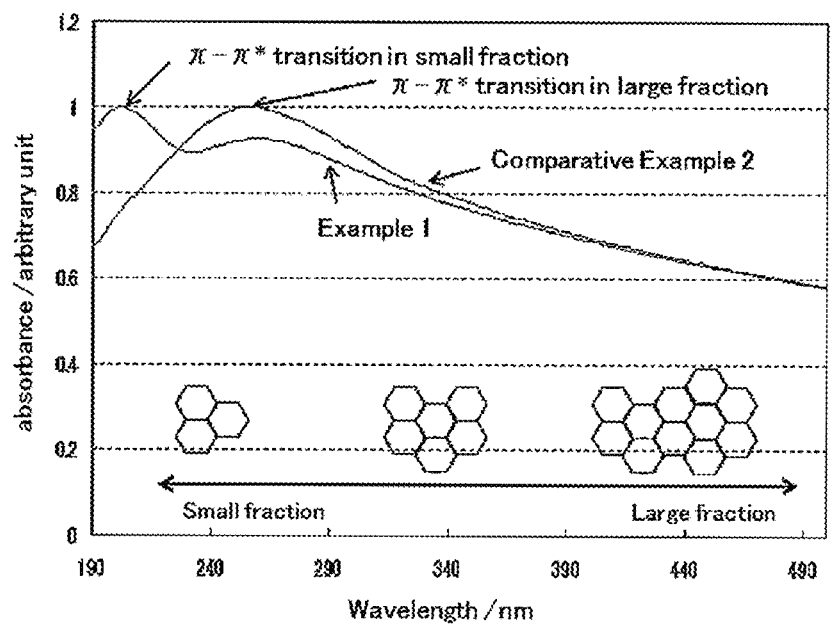
FIG. 3 shows a graph in which ultraviolet visible spectra in water-soluble fractions of conductive carbon in a working example and a comparative example are compared.

Since the treatment of the strong oxidizing process involves a change in the surface functional group of the carbon, this change in the surface functional group can be confirmed by analyzing a hydrophilic component of conductive carbon, so the ultraviolet visible spectrum of the remaining portion of the hydrophilic component (the liquid phase of the superintendent), from which the hydrophilic solid phase component had been taken, was measured. FIG. 3 shows the ultraviolet visible spectra of the abovementioned liquid phases of the conductive carbon in Comparative Example 2 and Example 1. In the spectrum of Example 1, the $\pi-\pi^*$ transition in a small fraction (a small-size graphene) that was not found in the spectrum of Comparative Example 2 was clearly recognized, and it was found that the graphene was severed into small-sized fragments in the strong oxidizing process.

Figure 4:
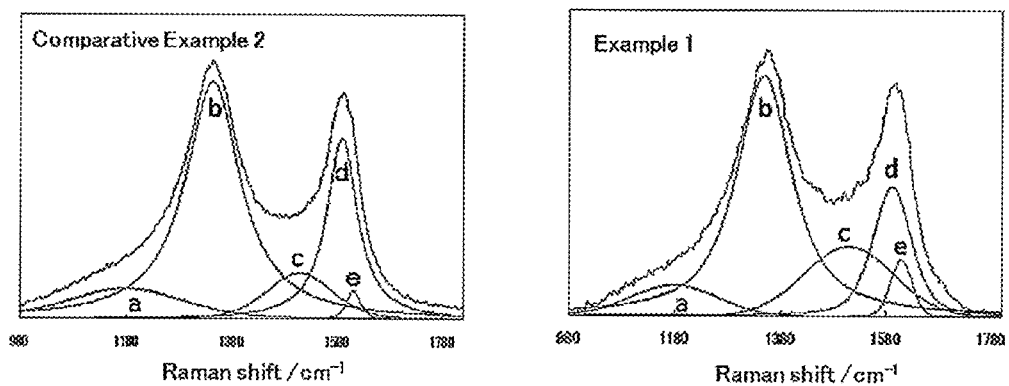
FIG. 4 shows graphs in which Raman spectra of hydrophilic solid phase components in conductive carbon in a working example and a comparative example are compared.

FIG. 4 shows the Raman spectra in the range from 980 to 1780 $cm^{-1}$ of the hydrophilic solid phase components of conductive carbon in Comparative Example 2 and Example 1 and the results of waveform separation. It was found that, in the spectrum of Example 1, compared with the spectrum of Comparative Example 2, the peak area of the component d, which derives from ideal graphite, was decreased, while the peak area of the component c, which derives from the amorphous component, and the peak area of the component e, which derives from the graphite with an oxidized surface, were increased. This shows that in the course of the strong oxidizing process, the conjugated double bond ($SP^2$ hybridization) of the graphene in the carbon raw material is strongly oxidized and that a large amount of the carbon single bond ($SP^3$ hybridization) area, that is, the amorphous component, is formed.

Figure 5:
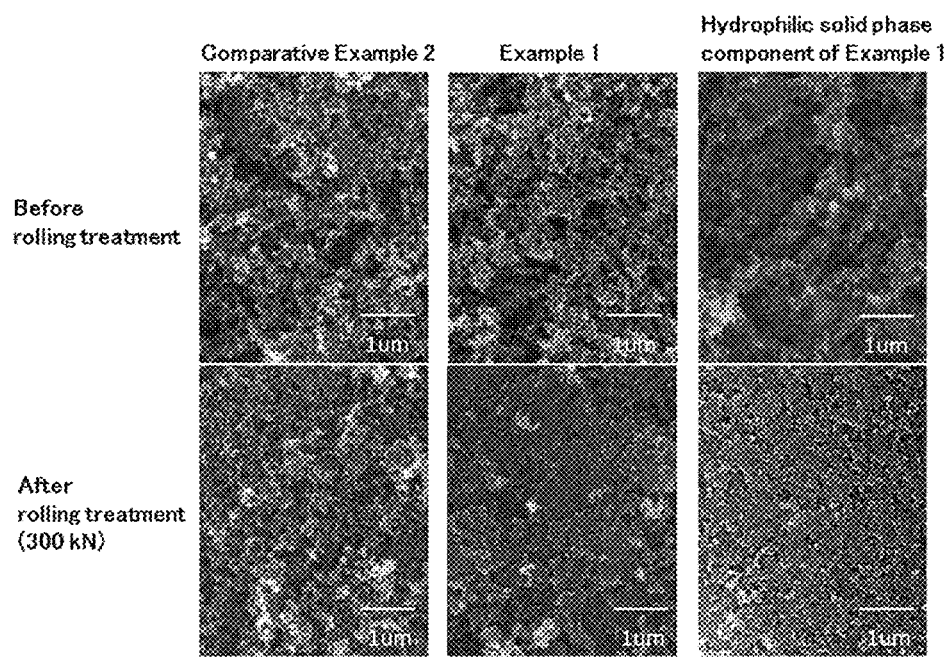
FIG. 5 shows SEM images of conductive carbon in a working example and a comparative example.

FIG. 5 shows the SEM images taken after the conductive carbon of Example 1, the conductive carbon of Comparative Example 2 or the hydrophilic solid phase component of the conductive carbon of Example 1 were each dispersed in a dispersion medium, the dispersoid obtained was coated on an aluminum foil, and a dried coating film was obtained. The SEM images taken after a rolling treatment at 300 kN was given to the coating films are also shown. The coating film of the conductive carbon of Comparative Example 2 did not show a significant change before and after the rolling treatment. However, in the case of the coating film of the conductive carbon of Example 1, as can be seen in the SEM images, the asperity of the surface was remarkably decreased by the rolling treatment and the carbon spread in a paste-like manner. Therefore, it was found that the characteristics of the carbon significantly changed due to the strong oxidizing treatment. Comparison of the SEM images of the coating film of the hydrophilic solid phase component of the conductive carbon of Example 1 and the SEM images of the coating film of the conductive carbon of Example 1 reveals that the surface of the coating film of the hydrophilic solid phase component became flatter by the rolling treatment and the carbon further spread in a paste-like manner. Based on this result, it was considered that the characteristic of the conductive carbon of Example 1 of spreading in a paste-like manner was mainly attributable to the hydrophilic solid phase component.

Figure 6:
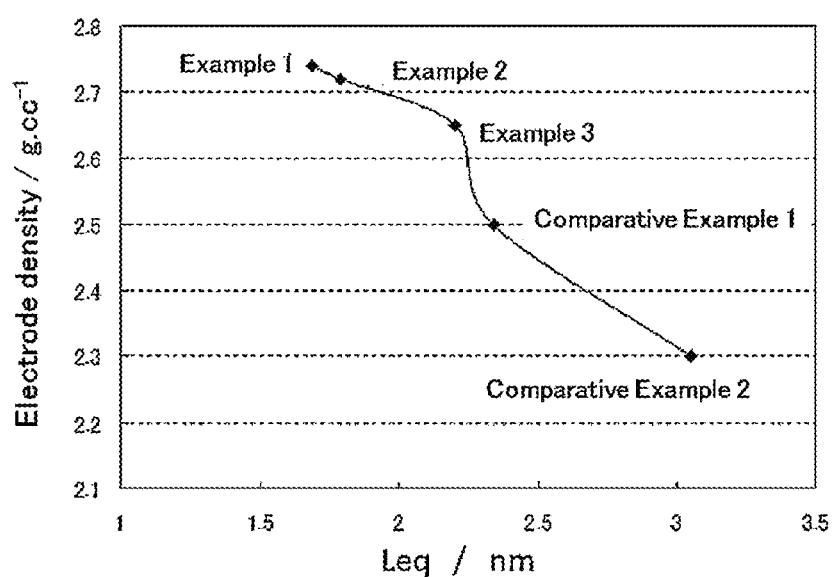
FIG. 6 shows a graph in which the relationship between Leq and the electrode density is shown.

FIG. 6 shows the relationship between the Leq of the hydrophilic solid phase component in the conductive carbon and the electrode density in Examples 1 to 3 and Comparative Examples 1 and 2. As this graph suggests, when the Leq decreased from 2.35 nm (Comparative Example 1) to 2.20 nm (Example 3), the electrode density increased remarkably.

Based on this result, it was considered that destruction of a twisted area in the graphene surface direction in the crystallite at a certain amount or more greatly contributed to the increase in electrode density.

(2) The Influence of Structure

Comparative Example 3

As mentioned above, a carbon structure is severed in the strong oxidizing process. To investigate the effect of a reduction in the size of structure, commercially available conductive carbon (DBP oil absorption quality=134.3 mL/100 g), which has almost the same DBP oil absorption quality as the conductive carbon of Example 1 (DBP oil absorption quality=130 mL/100 g) but for which the Leq of the hydrophilic solid phase component is larger than the range of the present invention, was used instead of the conductive carbon of Example 1, a positive electrode containing LiFePO$_4$ that was obtained by same method as in Example 1 was manufactured, and the electrode density was calculated. The electrode density obtained was 2.4 g/cm$^3$. This result revealed that reduction in the structure alone did not achieve improvement in electrode density.

(3) The Influence of Carbon Raw Material

Comparative Example 4

Instead of Ketjen Black, which was used as a carbon raw material in Example 1, solid acetylene black (diameter of initial particle: 40 nm) was used, and the procedure of Example 1 was repeated. As a result, the Leq of the hydrophilic solid phase component was not decreased by the strong oxidizing treatment to within the range of the present invention, the electrode density was 2.35 g/cm$^3$ and improvement in the electrode density was not achieved. Therefore, it was found that usage of a carbon material with an inner vacancy as a raw material was important.

(4) Conductive Carbon Obtained by the Second Manufacturing Method

Example 4

Ketjen Black (EC300J, manufacturer: Ketjen Black International Co.) weighing 0.45 g was mixed with 4.98 g Co(CH$_3$COO)$_2$.4H$_2$O, 1.6 g LiOH.H$_2$O and 120 mL distilled water, and the mixed fluid obtained was agitated by a stirrer for 1 hour, and then a mixture was collected by filtering. Then, 1.5 g LiOH.H$_2$O was mixed through an evaporator and then heated at 250° C. for 30 minutes in air, and a complex in which a lithium cobalt chemical compound was supported by Ketjen Black was obtained. 1 g of the complex obtained was added to 100 mL aqueous solution in which concentrated sulfuric acid (98%), concentrated nitric acid (70%) and hydrochloric acid (30%) were mixed at the volume ratio of 1:1:1, and the lithium cobalt chemical compound in the complex was dissolved by irradiating the mixed fluid obtained with an ultrasonic wave for 15 minutes, and then the residual solid matter was filtered, washed with water and dried. A part of the solid matter after drying was heated to 900° C. in air and its weight loss was measured by TG analysis. Until it was confirmed that the weight loss was 100%, that is, no lithium cobalt chemical compound remained, the abovementioned process of dissolving the lithium cobalt chemical compound in the abovementioned acid aqueous solution, filtering, washing with water and drying was repeated, so that conductive carbon that did not contain any lithium cobalt chemical compound was obtained.

Then, the DBP oil absorption quantity and micropore distribution of Ketjen Black used and the conductive carbon obtained were measured. Further, 40 mg of the conductive carbon obtained was added to 40 mL pure water and the carbon was dispersed in the pure water by applying ultrasonic irradiation for 30 minutes. The resultant supernatant solution was collected and centrifuged, a solid phase area was gathered and dried, and a hydrophilic solid phase component was obtained. For the hydrophilic solid phase component obtained, a Raman spectrum was measured with a microscopic Raman measurement device (excitation ray: argon ion laser; wavelength: 514.5 nm). From the Raman spectrum obtained, La, Leq, Leq/La and the amorphous component ratio were calculated. The conductive carbon obtained showed almost the same DBP oil absorption quantity, reduction rate in the number of pores with the radius of 1.2 nm, and values of La, Leq, Leq/La and amorphous component ratio as the conductive carbon in Example 1.

(5) Evaluation as a Lithium Ion Secondary Battery

Example 5

Li$_2$CO$_3$, Co(CH$_3$COO)$_2$ and C$_6$H$_8$O$_7$.H$_2$O were introduced into distilled water, the mixed fluid obtained was agitated by a stirrer for 1 hour, and then the mixed fluid was evaporated, dried and solidified at 100° C. in air and was then heated at 800° C. in air for 10 minutes, and LiCoO$_2$ fine particles with an average diameter of 0.5 μm were obtained. These particles, commercially available LiCoO$_2$ gross particles (average diameter: 13 μm) and the conductive carbon obtained in Example 1 were mixed at the mass ratio of 9:90:1, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and then given a rolling treatment, and a positive electrode for a lithium ion secondary battery was obtained. The electrode density of the positive electrode was calculated from the measured values of the volume and weight of the active material layer on the aluminum foil in the positive electrode. Also, using the positive electrode obtained, a lithium ion secondary battery was manufactured in which a 1M LiPF$_6$ solution with 1:1 ethylene carbonate/diethyl carbonate was used as an electrolytic solution, and in which lithium was used as a counter electrode. The capacity density per volume of the battery obtained was measured at the rate of 0.1 C.

Example 6

Fine particles with an average diameter of 2 μm were obtained by changing the duration of heating at 800° C. in air in the manufacturing process of LiCoO$_2$ particles in Example 5. The procedure of Example 5 was repeated by using the fine particles obtained, which had an average diameter of 2 μm, instead of the fine particles with an average diameter of 0.5 μm.

Example 7

Fine particles with an average diameter of 2.5 μm were obtained by changing the duration of heating at 800° C. in air in the manufacturing process of LiCoO$_2$ particles in Example 5. The procedure of Example 5 was repeated by using the fine particles obtained, which had an average diameter of 2.5 μm, instead of the fine particles with an average diameter of 0.5 μm.

Comparative Example 5

Commercially available LiCoO$_2$ gross particles (average diameter: 13 μm) and acetylene black, which was used as a carbon raw material in Comparative Example 4, were mixed at the mass ratio of 99:1, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and then given a rolling treatment, and a positive electrode for a lithium ion secondary battery was obtained. The electrode density of the positive electrode was calculated from the measured values of the volume and weight of the active material layer on the aluminum foil in the positive electrode. Also, using the positive electrode obtained, the capacity density per volume was measured by the same process as the process in Example 5.

Example 8

$Li_2CO_3$, $Ni(CH_3COO)_2$, $Mn(CH_3COO)_2$ and $Co(CH_3COO)_2$ were introduced into distilled water, the mixed fluid obtained was agitated by a stirrer for 1 hour, and then the mixed fluid was evaporated, dried and solidified at 100° C. in air. The solidified material was blended with a ball mill, and then heated at 800° C. in air for 10 minutes, and $LiNi_{0.5}Mn_{0.3}Co_{0.2}O_2$ fine particles with an average diameter of 0.5 μm were obtained. These particles, commercially available $LiNi_{0.5}Mn_{0.3}Co_{0.2}O_2$ gross particles (average diameter: 7.5 μm) and the conductive carbon obtained in Example 1 were mixed at the mass ratio of 8:90:2, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and then given a rolling treatment, and a positive electrode for a lithium ion secondary battery was obtained. The electrode density of the positive electrode was calculated from the measured values of the volume and weight of the active material layer on the aluminum foil in the positive electrode. Also, using the positive electrode obtained, a lithium ion secondary battery was manufactured in which a 1M $LiPF_6$ solution with 1:1 ethylene carbonate/diethyl carbonate was used as an electrolytic solution, and in which lithium was used as a counter electrode. The capacity density per volume of the battery obtained was measured at the rate of 0.1 C.

Example 9

Fine particles with an average diameter of 2 μm were obtained by changing the duration of heating at 800° C. in air in the manufacturing process of a $LiNi_{0.5}Mn_{0.3}Co_{0.2}O_2$ particle in Example 8. The procedure of Example 8 was repeated by using the fine particles obtained, which had an average diameter of 2 μm, instead of the fine particles with an average diameter of 0.5 μm.

Example 10

Fine particles with an average diameter of 2.5 μm were obtained by changing the duration of heating at 800° C. in air in the manufacturing process of a $LiNi_{0.5}Mn_{0.3}Co_{0.2}O_2$ particle in Example 8. The procedure of Example 8 was repeated by using the fine particles obtained, which had an average diameter of 2.5 μm, instead of the fine particles with an average diameter of 0.5 μm.

Comparative Example 6

Commercially available $LiNi_{0.5}Mn_{0.3}Co_{0.2}O_2$ gross particles (average diameter: 7.5 μm) and acetylene black, which was used as a carbon raw material in Comparative Example 4, were mixed at the mass ratio of 98:2, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and then given a rolling treatment, and a positive electrode for a lithium ion secondary battery was obtained. The electrode density of the positive electrode was calculated from the measured values of the volume and weight of the active material layer on the aluminum foil in the positive electrode. Also, using the positive electrode obtained, the capacity density per volume was measured by the same process as the process in Example 8.

Table 2 shows electrode density and capacity density per volume in Examples 5 to10 and Comparative Examples 5 and 6.

TABLE 2

Electrode density and capacity density

| | Fine particle | | | Gross particle | | | Carbon | | Electrode | Capacity |
| | Particle | | | Particle | | | | | | |
| | Active material | diameter (μm) | Compounding ratio | Active material | diameter (μm) | Compounding ratio | Type | Compounding ratio | density (g/cc) | density (mA/cc) |
|---|---|---|---|---|---|---|---|---|---|---|
| Example 5 | LCO | 0.5 | 9 | LCO | 13 | 90 | Example 1 | 1 | 4.2 | 600 |
| Example 6 | LCO | 2.0 | 9 | LCO | 13 | 90 | Example 1 | 1 | 4.0 | 571 |
| Example 7 | LCO | 2.5 | 9 | LCO | 13 | 90 | Example 1 | 1 | 3.9 | 557 |
| Comparative Example 5 | — | — | — | LCO | 13 | 99 | AB | 1 | 3.7 | 476 |
| Example 8 | NCM | 0.5 | 8 | NCM | 7.5 | 90 | Example 1 | 2 | 4.1 | 656 |
| Example 9 | NCM | 2.0 | 8 | NCM | 7.5 | 90 | Example 1 | 2 | 3.5 | 560 |
| Example 10 | NCM | 2.5 | 8 | NCM | 7.5 | 90 | Example 1 | 2 | 3.4 | 544 |
| Comparative Example 6 | — | — | — | NCM | 7.5 | 98 | AB | 2 | 3.4 | 490 |

LCO: $LiCoO_2$
NCM: $LiNi_{0.5}Mn_{0.3}Co_{0.2}O_2$
AB: acetylene black

Comparing the electrode materials of Examples 5 to 7 with the electrode material of Comparative Example 5, the quantity of active material contained in the electrode materials is the same, but in the electrode materials of Examples 5 to 7, some of the active material particles are fine particles. Similarly, comparing the electrode materials of Examples 8 to 10 with the electrode material of Comparative Example 6, the quantity of an active material contained is the same, but in the electrode materials of Examples 8 to 10, some of active material particles are fine particles. Fine particles are generally prone to aggregation, but as can be seen from Table 2, the electrode density and capacity density were increased by using the conductive carbon in Example 1. Especially, the increase in capacity density was remarkable. Moreover, in Examples, the electrode density and capacity density were increased more as the particle diameter of the fine particles was decreased. From these results and the result shown in FIG. 5, it was found that the conductive carbon of the present invention dispersed fine particles as well as gross particles excellently, and by applying a rolling treatment in manufacturing an electrode, the conductive carbon of the present invention spread in a paste-like manner, covered the surface of the active material particles, and together with the fine particles, was pushed out into and densely filled a gap formed between adjacent gross particles. Also, from the remarkable increase in the capacity density, it was found that the dense, paste-like conductive carbon that was formed by adding pressure to the conductive carbon of the present invention had enough conductivity to serve as an electroconductive agent and did not inhibit the impregnation of the electrolytic solution in the lithium ion secondary battery.

(6) The Influence of an Average Diameter of Fine Particles

Example 11

$Li_2CO_3$, $Co(CH_3COO)_2$ and $C_6H_8O_7 \cdot H_2O$ were introduced into distilled water, the mixed fluid obtained was agitated by a stirrer for 1 hour, and then the mixed fluid was evaporated, dried and solidified at 100° C. in air and then heated at 800° C. in air, and $LiCoO_2$ fine particles were obtained. In this process, by changing the duration of heating at 800° C. in air, more than one kind of fine particles with a different average diameter was obtained. One of these kinds of fine particles with a different average diameter, commercially available $LiCoO_2$ gross particles (average diameter: 13 μm), the conductive carbon obtained in Example 1, and the acetylene black used as a carbon raw material in Comparative Example 4 were mixed at the mass ratio of 9:90:1:2, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and given a rolling treatment, and a positive electrode of a lithium ion secondary battery was obtained. The electrode density of the positive electrode was calculated from the measured values of the volume and weight of the active material layer on the aluminum foil in the positive electrode.

Figure 7:
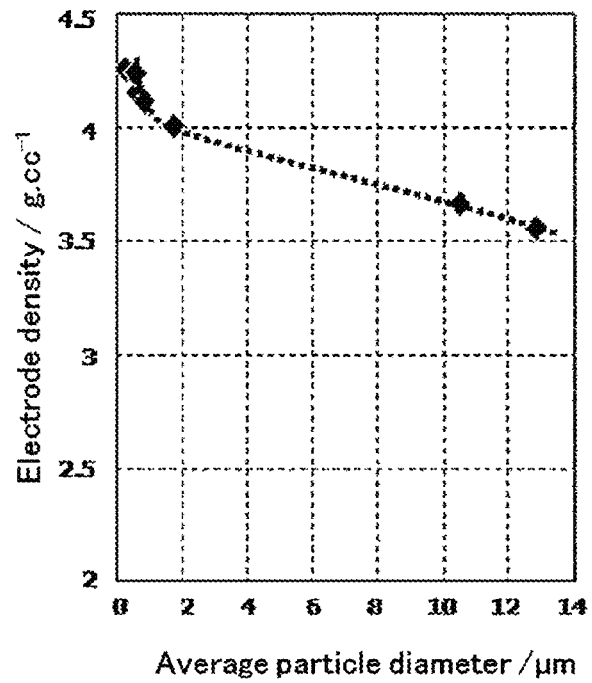
FIG. 7 shows a graph in which the relationship between the average particle diameter of $LiCoO_2$ fine particles and the electrode density is shown.

FIG. 7 shows the relationship between the average diameter of the fine particles obtained and the electrode density. It was found that the electrode density rapidly increased if the average diameter of the fine particles became 2 μm or less. As electrode density increases, the capacity density and accordingly the energy density of a battery increases, so it was found that a lithium ion secondary battery with high energy density can be obtained by using the gross particles with an average diameter of 15 μm and the fine particles with an average diameter of 2 μm or less.

Example 12

$Li_2CO_3$, $Ni(CH_3COO)_2$, $Mn(CH_3COO)_2$ and $Co(CH_3COO)_2$ were introduced into distilled water, the mixed fluid obtained was agitated by a stirrer for 1 hour, and then the mixed fluid was evaporated, dried and solidified at 100° C. in air. The solidified material was blended in a ball mill, and then heated at 800° C. in air, and $LiNi_{0.5}Mn_{0.3}Co_{0.2}O_2$ fine particles were obtained. In this process, by changing the duration of heating at 800° C. in air, more than one kind of fine particles with a different average diameter was obtained. One of these kinds of fine particles with a different average diameter, commercially available $LiNi_{0.5}Mn_{0.3}Co_{0.2}O_2$ gross particles (average diameter: 7.5 μm), the conductive carbon obtained in Example 1, and the acetylene black used as a carbon raw material in Comparative Example 4 were mixed at the mass ratio of 8:90:2:2, and an electrode material was obtained. Then, 5% by mass of the total mass of polyvinylidene fluoride and an adequate quantity of N-methyl pyrrolidone were added to the electrode material and kneaded sufficiently so that slurry was formed, and this slurry was coated on an aluminum foil, and an active material layer was formed. The active material layer was dried and given a rolling treatment, and a positive electrode of a lithium ion secondary battery was obtained. The electrode density of the positive electrode was calculated from the measured values of the volume and weight of the active material layer on the aluminum foil in the positive electrode.

Figure 8:
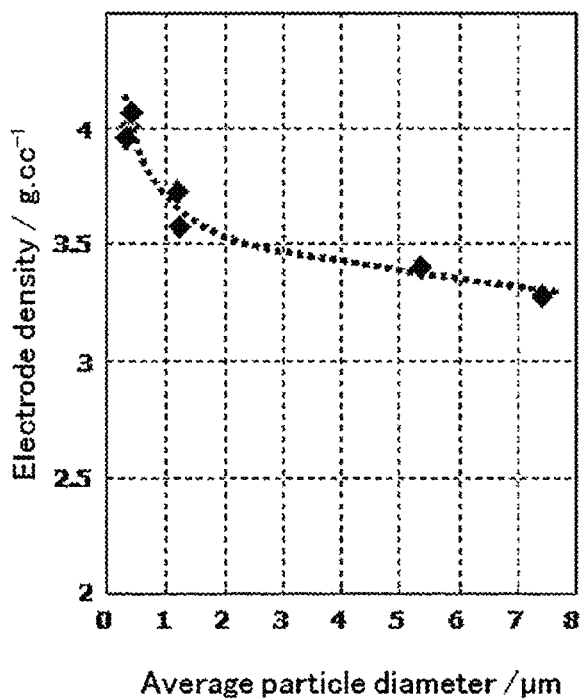
FIG. 8 shows a graph in which the relationship between the average particle diameter of $LiNi_{0.5}Mn_{0.3}Co_{0.2}O_2$ fine particles and the electrode density is shown.

FIG. 8 shows the relationship between the average diameter of the fine particles obtained and the electrode density. It was found that the electrode density rapidly increased if the average diameter of the fine particles became 2 μm or less. As electrode density increases, the capacity density and accordingly the energy density of a battery increases, so it was found that a lithium ion secondary battery with high energy density can be obtained by using the gross particles with an average diameter of 7.5 μm and the fine particles with an average diameter of 2 μm or less.

INDUSTRIAL APPLICABILITY

By using the conductive carbon of the present invention, an electric storage device with a high energy density can be obtained.

What is claimed is:

1. Conductive carbon for an electrode of an electric storage device, comprising a hydrophilic solid phase component, where a crystallite size La that does not include a twist in a graphene surface direction and a crystallite size Leq that includes a twist in a graphene surface direction, which are calculated from a Raman spectrum of the hydrophilic solid phase component, satisfy the following relationships:

$1.3 \text{ nm} \leq La \leq 1.5 \text{ nm}$, and $1.5 \text{ nm} \leq Leq \leq 2.3 \text{ nm}$, and $1.0 \leq Leq/La \leq 1.55$.

2. The conductive carbon according to claim 1, wherein dibutyl phthalate oil absorption quantity per 100 g of the conductive carbon is within a range of 100 to 200 mL.

3. The conductive carbon according to claim 2, manufactured by giving an oxidizing treatment to a carbon raw material having an inner vacancy.

4. The conductive carbon according to claim 3, wherein the number of micropores with a radius of 1.2 nm in the conductive carbon is 0.4 to 0.6 times the number of micropores with a radius of 1.2 nm in the carbon raw material.

5. An electrode material for an electric storage device comprising:
the conductive carbon according to claim 2; and
an electrode active material particle.

6. The electrode material according to claim 5, wherein an average diameter of the electrode active material particles is within a range of 0.01 to 2 μm.

7. The electrode material according to claim 5, wherein the electrode active material particles are composed of fine particles with an average diameter of 0.01 to 2 μm that are operable as a positive electrode active material or a negative electrode active material and gross particles with an average diameter of more than 2 μm and not more than 25 μm that are operable as an active material of the same electrode as the fine particles.

8. An electrode for an electric storage device, comprising an active material layer formed by adding pressure to the electrode material according to claim 7.

9. The electrode material according to claim 5, further comprising other conductive carbon.

10. An electrode for an electric storage device, comprising an active material layer formed by adding pressure to the electrode material according to claim 5.

11. The conductive carbon according to claim 1, manufactured by giving an oxidizing treatment to a carbon raw material having an inner vacancy.

12. The conductive carbon according to claim 11, wherein the number of micropores with a radius of 1.2 nm in the conductive carbon is 0.4 to 0.6 times the number of micropores with a radius of 1.2 nm in the carbon raw material.

13. An electrode material for an electric storage device comprising:
the conductive carbon according to claim 1; and
an electrode active material particle.

14. The electrode material according to claim 13, wherein an average diameter of the electrode active material particles is within a range of 0.01 to 2 μm.

15. The electrode material according to claim 13, wherein the electrode active material particles are composed of fine particles with an average diameter of 0.01 to 2 μm that are operable as a positive electrode active material or a negative electrode active material and gross particles with an average diameter of more than 2 μm and not more than 25 μm that are operable as an active material of the same electrode as the fine particles.

16. An electrode for an electric storage device, comprising an active material layer formed by adding pressure to the electrode material according to claim 15.

17. An electric storage device equipped with the electrode according to claim 16.

18. The electrode material according to claim 13, further comprising other conductive carbon.

19. An electrode for an electric storage device, comprising an active material layer formed by adding pressure to the electrode material according to claim 13.

20. An electric storage device equipped with the electrode according to claim 19.

* * * * *